Aug. 2, 1960 S. T. CARTER 2,947,433
GUM-APPLYING APPARATUS FOR LABELING MACHINES
Original Filed Dec. 5, 1955 9 Sheets-Sheet 1

INVENTOR.
SIDNEY T. CARTER
BY
ATT'YS.

Aug. 2, 1960 S. T. CARTER 2,947,433
GUM-APPLYING APPARATUS FOR LABELING MACHINES
Original Filed Dec. 5, 1955 9 Sheets-Sheet 2

INVENTOR.
SIDNEY T. CARTER
BY
ATT'YS.

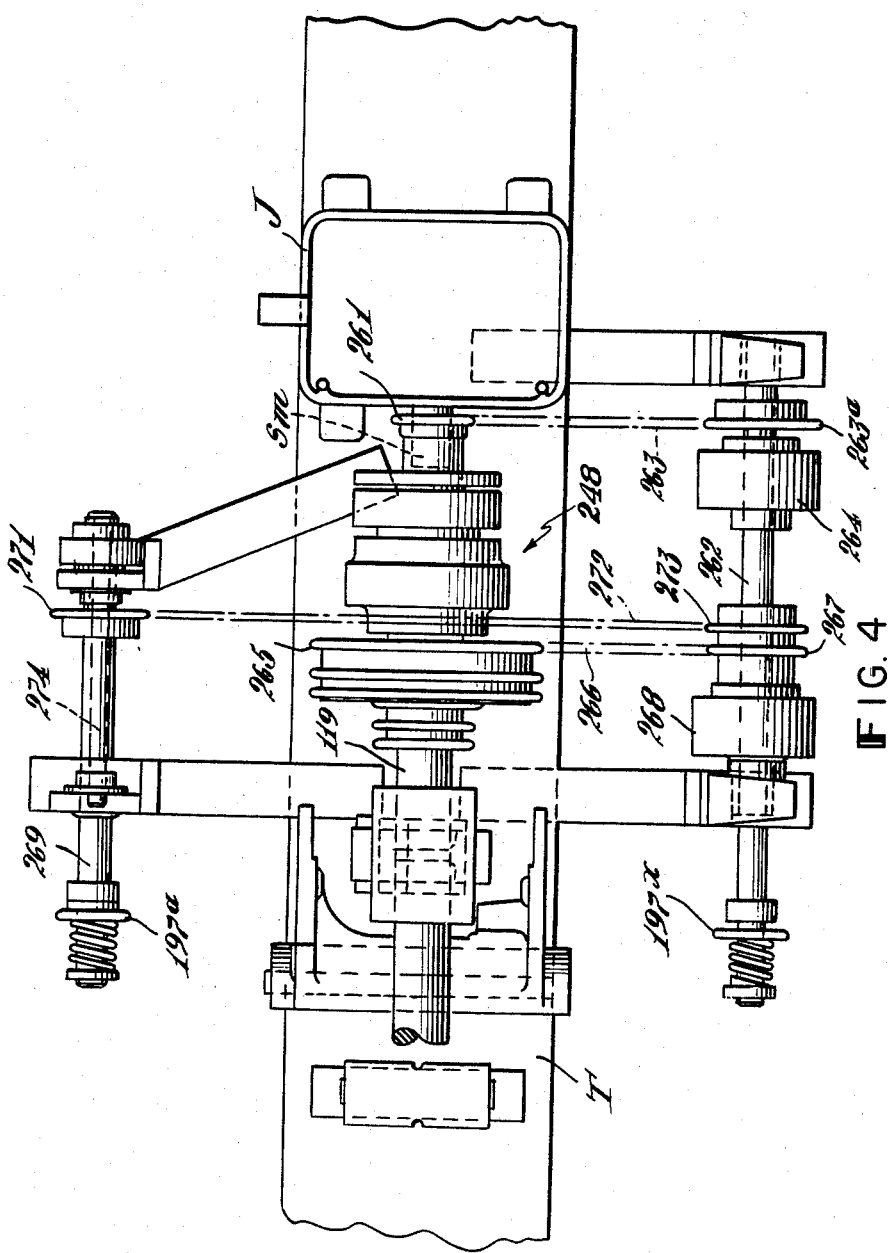

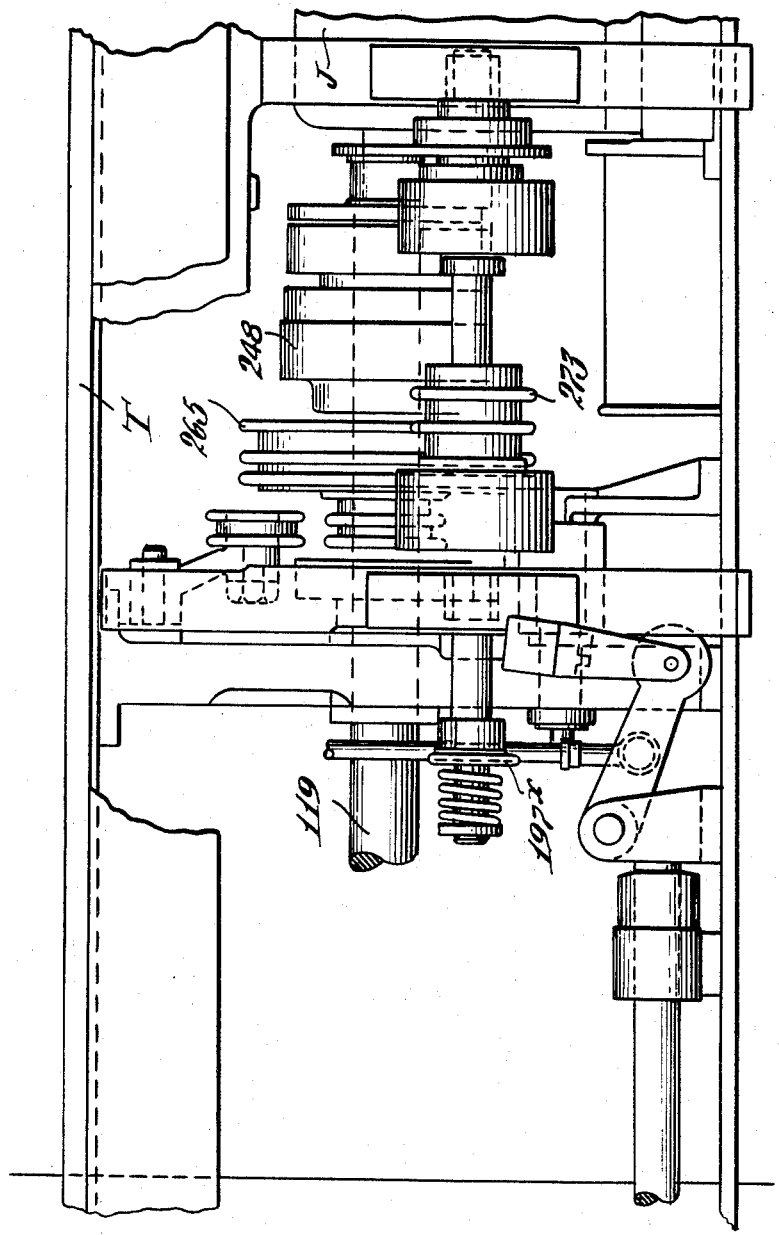

INVENTOR.
SIDNEY T. CARTER
BY
ATT'YS.

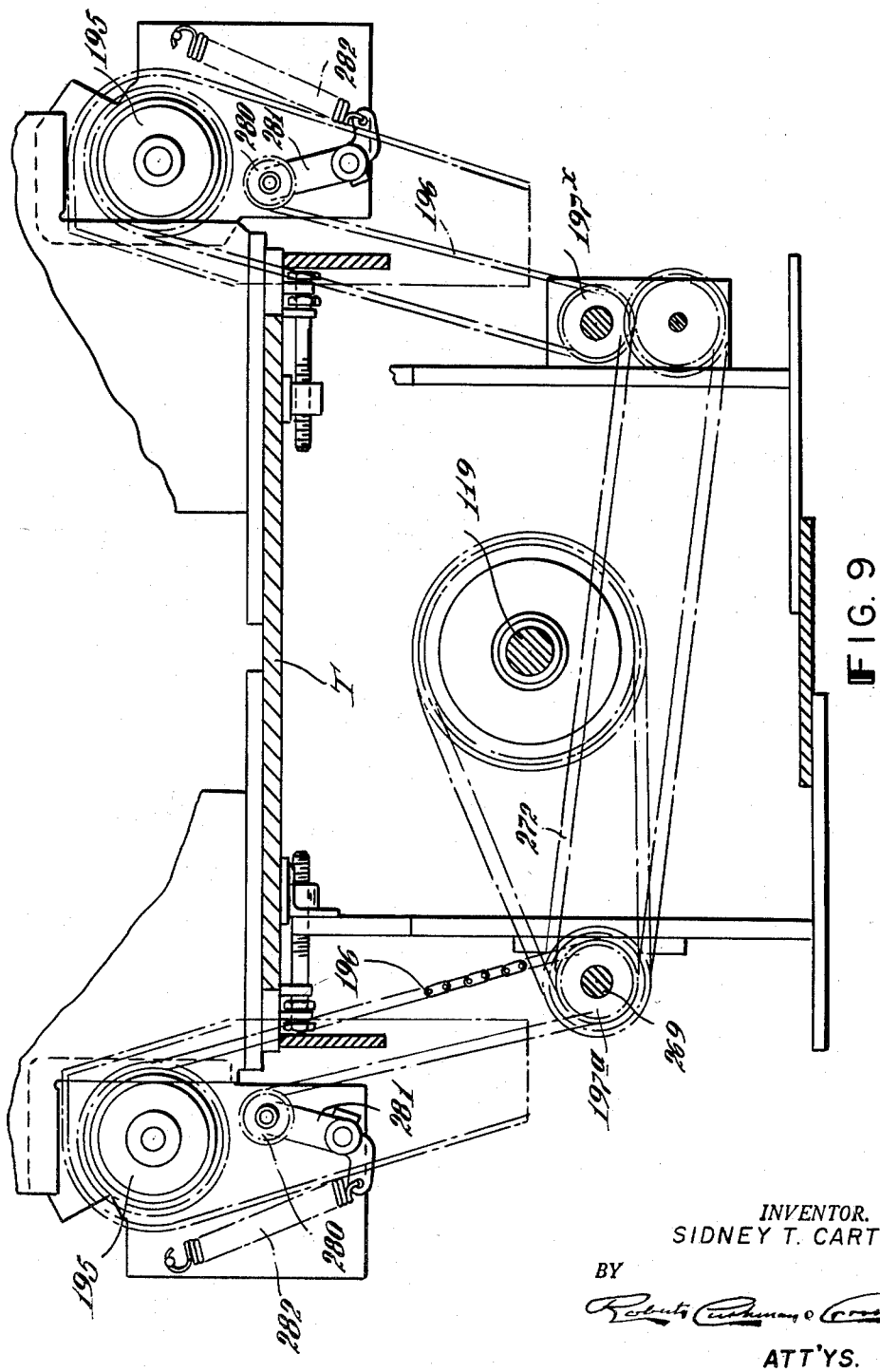

Aug. 2, 1960 S. T. CARTER 2,947,433
GUM-APPLYING APPARATUS FOR LABELING MACHINES
Original Filed Dec. 5, 1955 9 Sheets-Sheet 7
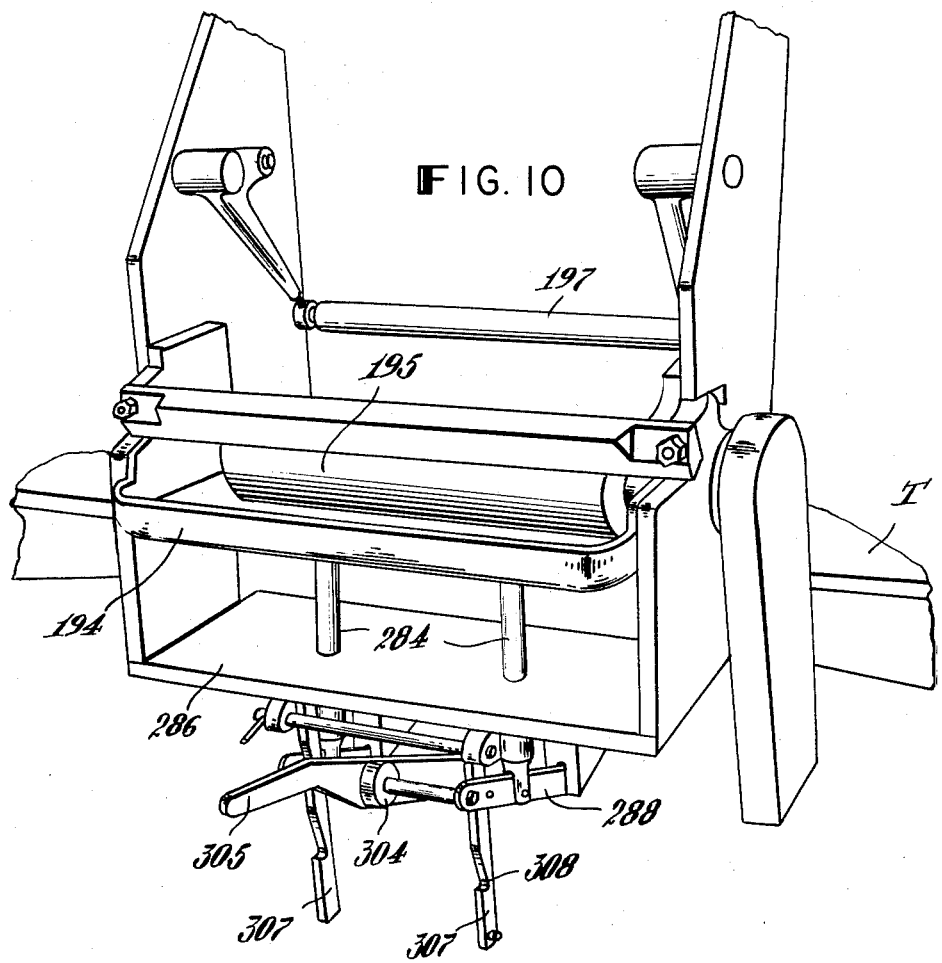
INVENTOR.
SIDNEY T. CARTER
BY
ATT'YS.

Aug. 2, 1960  S. T. CARTER  2,947,433
GUM-APPLYING APPARATUS FOR LABELING MACHINES
Original Filed Dec. 5, 1955  9 Sheets-Sheet 8
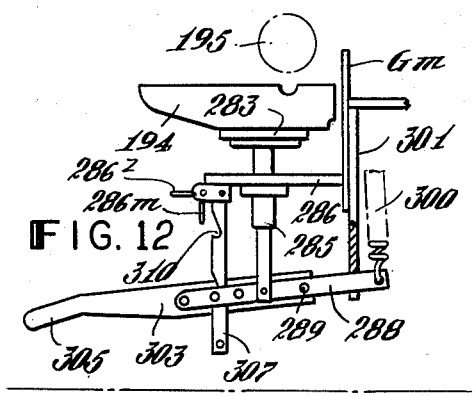
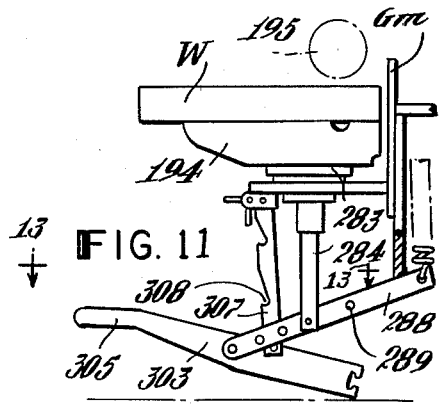
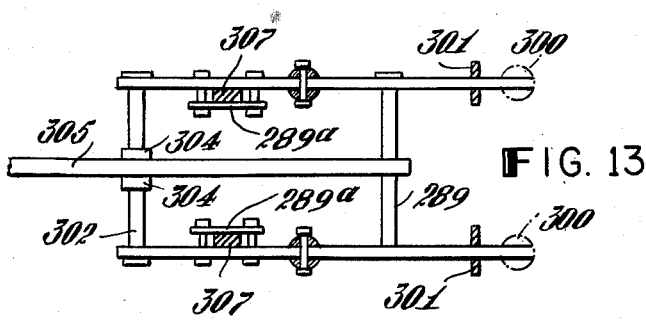
INVENTOR.
SIDNEY T. CARTER
BY
ATT'YS.

INVENTOR.
SIDNEY T. CARTER
BY
ATT'YS.

United States Patent Office 2,947,433
Patented Aug. 2, 1960

2,947,433

GUM-APPLYING APPARATUS FOR LABELING MACHINES

Sidney T. Carter, Shrewsbury, Mass., assignor to Geo. J. Meyer Manufacturing Co., Cudahy, Wis., a corporation of Wisconsin Original application Dec. 5, 1955, Ser. No. 551,012. Divided and this application Oct. 23, 1958, Ser. No. 769,229

11 Claims. (Cl. 216—12)

This invention pertains to labeling machines of the kind wherein articles to be labeled are moved one after another in succession along a predetermined path, and wherein one or more labels is or are applied to each article while the article continues to move along said path, and relates more especially to apparatus for applying gum to labels preparatory to affixing them to the articles.

Among the objects of the invention are to provide means for applying gum or glue to a label picker, said means comprising a gum or glue box and a gum-elevating roll, and with means operative to turn said roll, even though other elements of the machine may have stopped, at a very low or idling speed, much less than normal, thereby to prevent the gum from crusting over; to provide gum-applying means so devised that it may be adjusted bodily toward or from the article path to facilitate the application of labels to articles of different sizes; to provide means whereby the gum-elevating roll may be cleaned by turning it at less than normal operative speed while the lower portion of its periphery is immersed in a body of water; to provide gum-applying apparatus wherein a gum box is so mounted that it may easily be removed from normal operative position to facilitate the cleaning of the gum-elevating roll and/or the gum box itself; and to provide means whereby a washpan, designed to hold water during the washing of the gum-elevating roll, may readily be installed in the position of use and as readily removed. Other and further objects and advantages of the invention will be pointed out in the following more detailed description and by reference to the accompanying drawings wherein:

Fig. 4 is a plan view showing means for driving the gum-applying devices at opposite sides of the machine;

Fig. 5 is an elevational view showing certain of the parts illustrated in Fig. 4;

Fig. 9 is an end elevation, partly in vertical section, showing driving means for the gum rolls at opposite sides of the machine;

Fig. 10 is a perspective view of one of the gumming stations showing the gum box in operative position and with the transfer roll in position to apply gum to the pickers;

Fig. 11 is a fragmentary view, generally similar to Fig. 8, but showing the parts associated with the gum box in a different position;

Fig. 12 is a view similar to Fig. 11, but showing the parts in still another position;

Fig. 13 is a section substantially on the line 13—13 of Fig. 11; and

The present application is a division of application Serial No. 551,012, filed December 5, 1955, by Sidney T. Carter for Labeling Machine. Only such parts of the labeling machine as may be necessary for the disclosure of the gum-applying apparatus and its mode of operation will be described and illustrated in detail herein.

Figure 1:
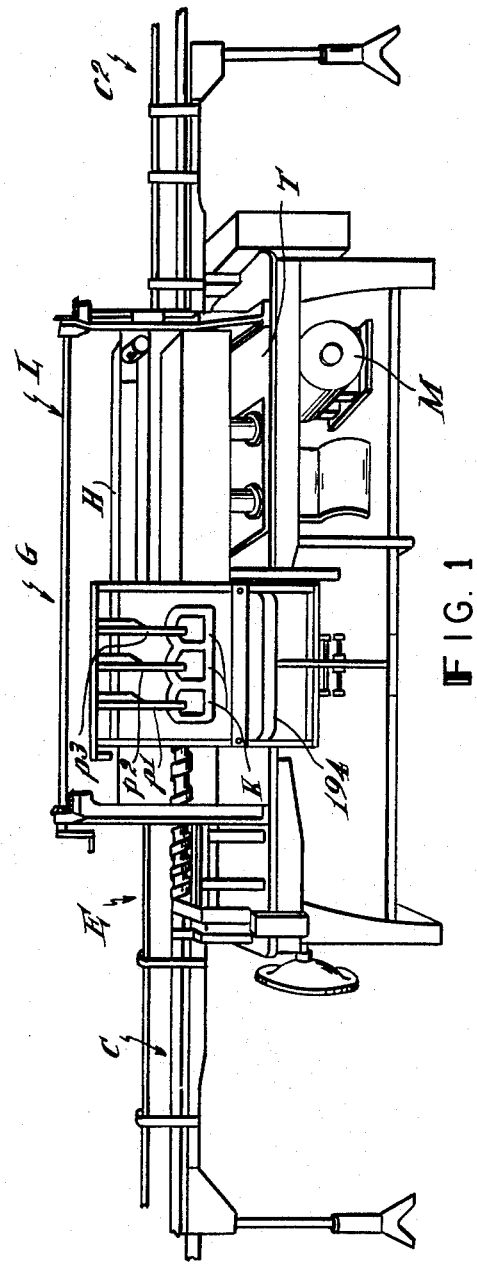
Fig. 1 is a diagrammatic front view of a labeling machine embodying the present invention.
Figure 2:
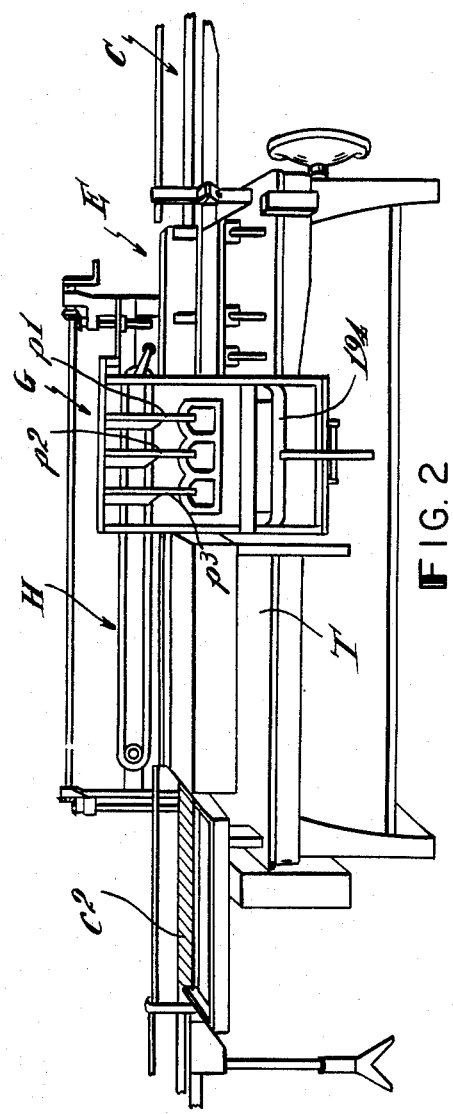
Fig. 2 is a diagrammatic rear elevation of the same machine.

The general appearance of the machine is illustrated in Figs. 1 and 2, the operative elements of the machine being supported by a suitable frame whose design is well within the province of the skilled machine builder, said frame supporting a horizontal table T beneath which the motor M, the main drive shaft 119 (Fig. 4) and most of the motion-transmitting connections are located. The main drive shaft 119 turns through an angle of 360° for each cycle of operations, that is to say, during that sequence of motion of the essential label-applying devices which includes the application of glue to a picker, removal of a label from the magazine by a picker, the application of glue to the label, the adhering of the label to the article, the wiping of the label and the return of the picker to its initial position. As diagrammatically illustrated in Figs. 1 and 2, the articles are supplied to the machine by a conveyor C; and, after receiving their labels, are discharged onto a delivery conveyor C2 (Fig. 2) which may be aligned with the conveyor C if desired. The entrance portion to the article path, along which the articles travel during the labeling operation, is indicated at E (Fig. 1); the gumming and label-applying station is indicated at G; and the label-wiping station at L. The conveyor C may be of conventional type, such as is used in labeling and similar machines, wherein an endless link chain carries flat plates which form a horizontal upper run on which the articles are supported while being labeled. During the operation of applying the labels, a suitable hold-down device, here indicated by the character H, contacts the tops of the articles so as to prevent them from tipping in response to the lateral thrust of the label-applying means. Between the motor M and the main shaft 119, suitable speed-changing means, which may be of conventional type, is embodied in the motion-transmitting mechanism; and automatic means (not here shown) but which may include a fluid pressure motor having a solenoid-actuated control valve, is provided for varying the speed of the shaft 119. The machine, as here illustrated, is designed to apply labels simultaneously to three bottles and to apply labels to opposite sides of each bottle while the bottles are travelling along the article path. Thus, as illustrated in Figs. 1 and 2, the apparatus comprises glue or gum-applying means at stations G at opposite sides of the article path, the glue-applying means at the opposite sides being substantially identical in construction; and suitable connections, hereafter more fully described, are provided for transmitting motion from the main shaft 119 to both gum-applying devices simultaneously. It will be understood that at each of the gum-applying stations, suitable label holders or magazines K (Fig. 1), or a plurality of such holders or magazines, will be provided, and that label pickers P¹, P² and P³ (Fig. 1) will be arranged to take labels from the respective magazines and deliver them to transfer devices such, for example, as suction grip fingers, whereby they are brought into contact with the articles to be labeled. Such pickers and transfer devices may be of conventional type and need not here be described in detail.

Figure 3:
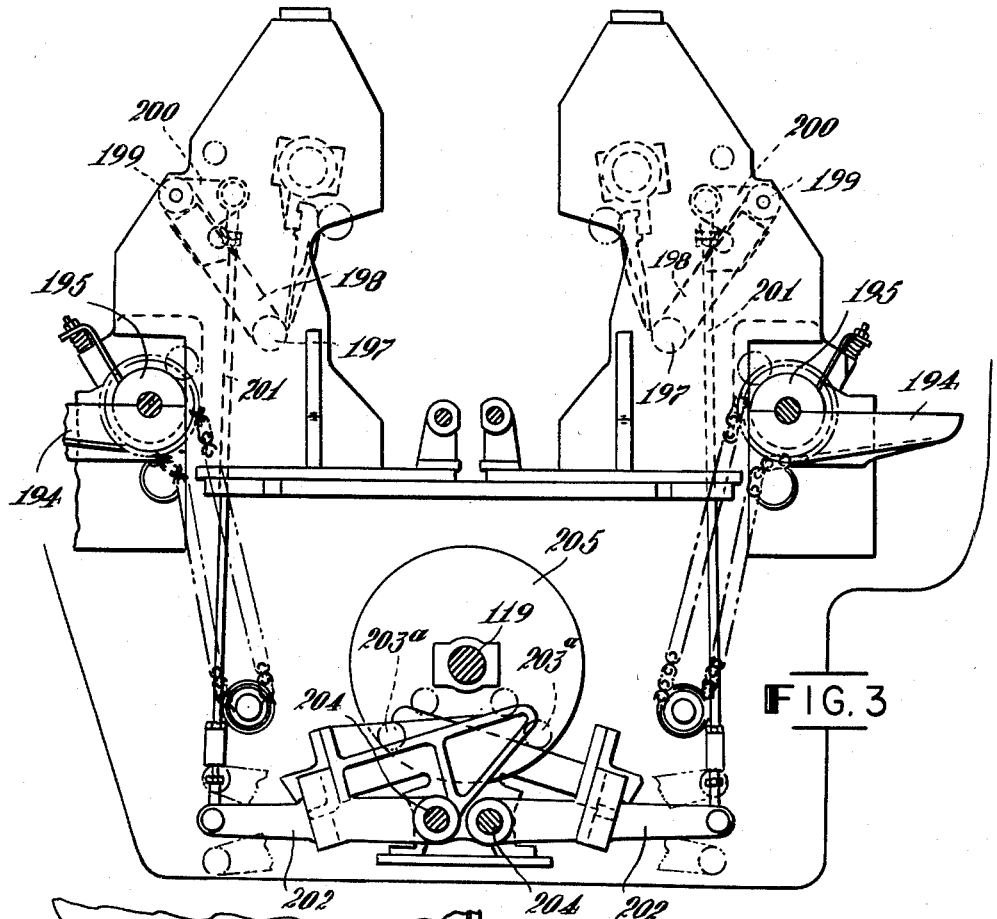
Fig. 3 is a fragmentary end elevation, to larger scale than Fig. 1, showing gum-applying apparatus located at opposite sides of the machine and indicating, in broken lines, the position of the gum transfer rolls when applying gum to pickers.

At each gumming station G, there is also provided (Figs. 1 and 2) a gum box 194 (at the front and back respectively of the machine) into each of which dips a constantly rotating, horizontal, gum-elevating roll 195 (Figs. 3 and 9).

Figure 7:
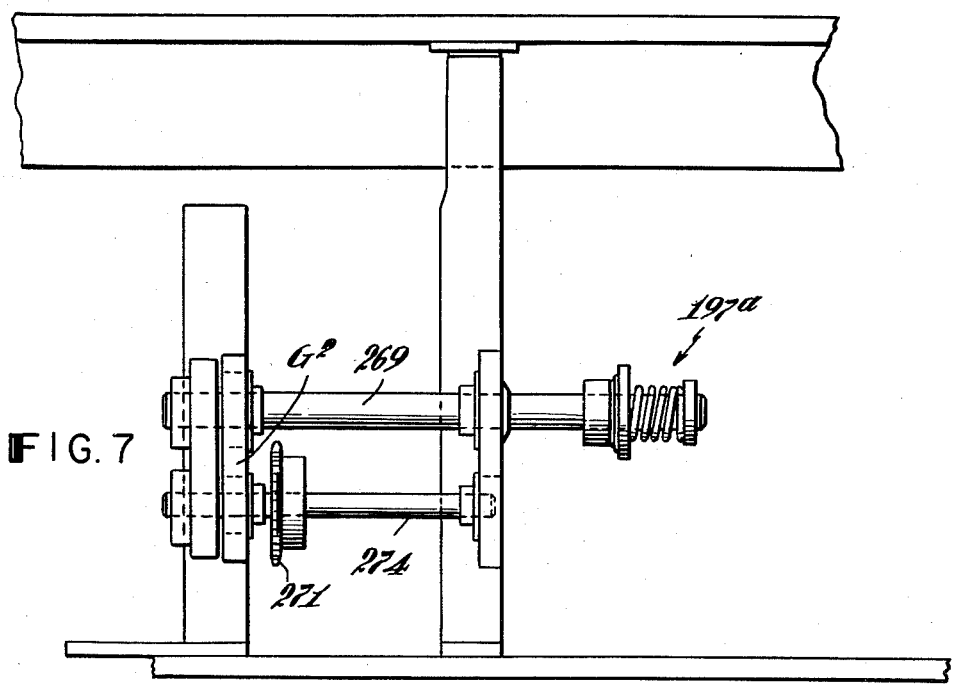
Fig. 7 is a fragmentary elevation looking from the rear of the apparatus as shown in Fig. 4.
Figure 6:
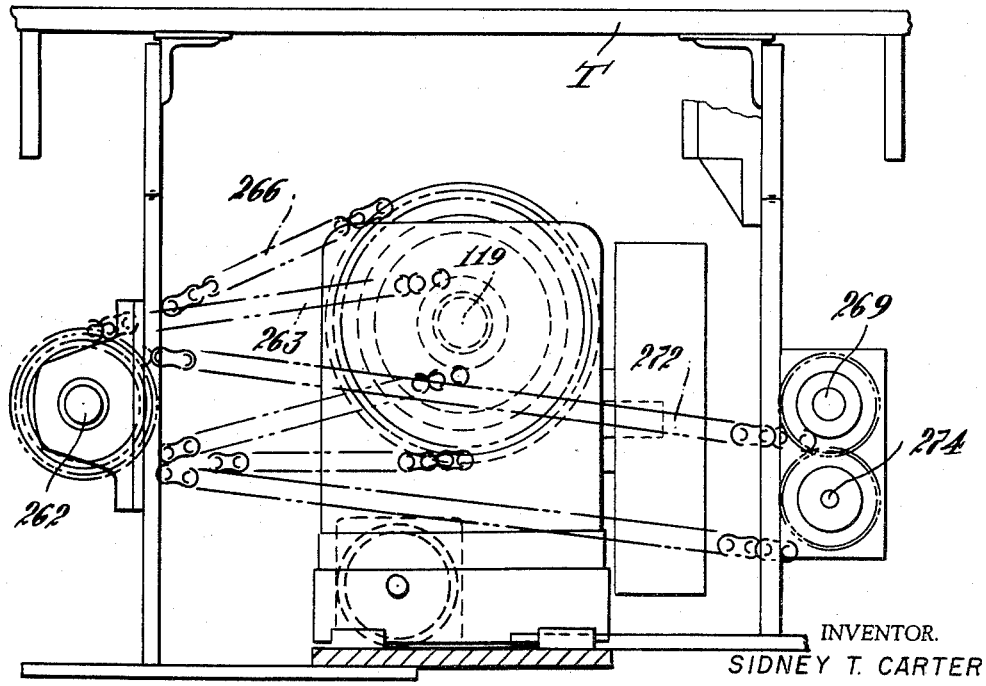
Fig. 6 is an end elevation, partly in vertical section, showing some of the parts illustrated in Fig. 5.

The two rolls 195 (Fig. 9) at the front and rear of the machine, respectively, are driven by sprocket chains 196 which pass about sprockets 197$^x$ and 197$^a$, respectively. Provision is made whereby, when the label-applying devices are stopped, the rolls 195 continue to rotate but at a slower than normal speed. This is to keep the gum in the gum boxes agitated so that it will not crust over on its surface. It is also desirable to run the rolls at slow speed so that the gum will not become more viscous as would be true if it were violently agitated. The means for driving the rolls 195 is more particularly illustrated in Figs. 4–9. Power for driving the gum rolls is taken under different conditions from the opposite sides of a magnetic clutch 248 (Figs. 4 and 5) whose driving and driven elements are fixed to the output shaft $S^m$ of the speed reducer J and the main shaft 119, respectively. When clutch 248 is disengaged and the motor M is still running, but main shaft 119 is not turning, a sprocket 261 (Fig. 4) on shaft $S^m$, by means of a chain 263, continues to turn an auxiliary drive shaft 262, the chain 263 passing about a sprocket 263$^a$ connected to shaft 262 by an overrunning clutch 264. When the clutch 248 is engaged and the main shaft 119 is turning, then the shaft 262 is driven by means of a sprocket 265, chain 266 and sprocket 267, the sprocket 267 being connected to the drive element of an overrunning clutch 268 whose driven element is fixed to the shaft 262. The drive sprocket 265 is much larger than the driven sprocket 267, and the drive sprocket 261 is smaller than the driven sprocket 263$^a$. It follows from this that, when the clutch 248 is engaged and the main shaft 119 is turning, shaft 262 is turning at a much higher speed than it is when the clutch 248 is disengaged. The sprocket 197$^x$ (Figs. 4 and 9) is connected to the shaft 262 by means of a spring-pressed slip clutch, and this sprocket 197$^x$ drives the chain 196 (Fig. 9) which turns the gum roll 195 at the front side of the machine. The sprocket 197$^a$ (Fig. 4) which drives the chain 196 (Fig. 9) for the gum roll at the other side of the machine is connected by a slip clutch to one end of a shaft 269 (Figs. 4, 6, 7 and 9) at the opposite side of the machine from the shaft 262. A sprocket 273 (Figs. 4 and 5) on shaft 262 is connected by a chain 272 (Figs. 4 and 9) to a sprocket 271 (Figs. 4, 6 and 7) on a shaft 274 below and parallel to the shaft 269 and which is connected to the latter by spur gears $G^2$ (Figs. 7 and 9) which cause the shaft 269 to turn in the opposite direction from the shaft 274. Thus, the gum rolls at opposite sides of the machine turn in opposite directions and at the same speed.

Since the machine of the present invention is desired to handle articles of various sizes, the gum box assemblies are arranged to be moved horizontally in and out to accommodate the various sizes to be labeled. For this purpose, a supporting housing for each gum box assembly, a portion of which is indicated at $G^m$ (Fig. 8), is adjustable horizontally by a jackscrew $S^2$ which may be turned in any convenient manner. To accommodate such adjustment of the gum box assembly, take-up sprockets 280 (Fig. 9) are arranged to engage each of the sprocket chains 196, respectively, each takeup sprocket 280 being mounted on one arm of a bell crank lever 281, respectively, to whose other arm a strong coiled spring 282 is secured. Thus, regardless of the position of the gum box assembly, the chain 196 will be kept taut for driving the gum rolls.

For supporting the gum boxes 194, vertically movable cradles 283 (Fig. 8) are provided, the cradle at each side, respectively, of the machine being mounted on the upper ends of vertically movable rods 284 (Fig. 8) which slide in suitable guides 285 carried by a horizontal shelf 286. The lower end of each rod 284 is pivotally connected to a rocker arm 288 whose rear end portion is movable to a limited extent vertically in a guide slot in the lower end of a fixed post 301 extending down from the housing $G^m$. The tension springs 300, attached to the extreme rear ends of the rocker arms, tend to move the rear ends of the arms to upper ends of the guide slots. The forward ends of the rocker arms are connected by a horizontal rod 302 (Fig. 13) which passes through an elongate slot in the mid-portion of an actuating lever 303 (Fig. 8) having a handle 305 at its upper end, the rod being provided with collars 304 at opposite sides of the lever 303 to keep the latter properly centered. Rigid supporting straps 307, one adjacent to each of the rocker arms 288, are each pivoted at their upper ends, respectively, to the shelf 286. Each of the straps 307 is provided at its forward edge with two vertically-spaced, hook-like notches 310 and 308 (Fig. 12). Each of the rocker arms 288 is provided at its inner side with an elongate retaining plate 289$^a$ (Fig. 13) spaced from the rocker arm proper and held in place by bolts at its opposite ends, the spacing of this plate from the rocker arm providing a slot through which the corresponding strap 307 passes with limited freedom of motion in the front-to-rear direction. The lever 303 is provided at its lower end (Fig. 8) with a notch 306$^a$ which is designed, at times, to engage a bar 289 connecting the rocker arms 288. An actuating handle or bell crank 286$^z$ is pivoted at the shelf 286 at 286$^x$ (Fig. 8) adjacent to each strap 307 respectively, each bell crank having a forward arm constituting a handle and also having a normally vertical, downwardly directed arm 286$^m$ which is engageable, by swinging the handle 286$^z$ downwardly, with the edge of the corresponding strap 307 thereby to rock the strap rearwardly.

Figure 8:
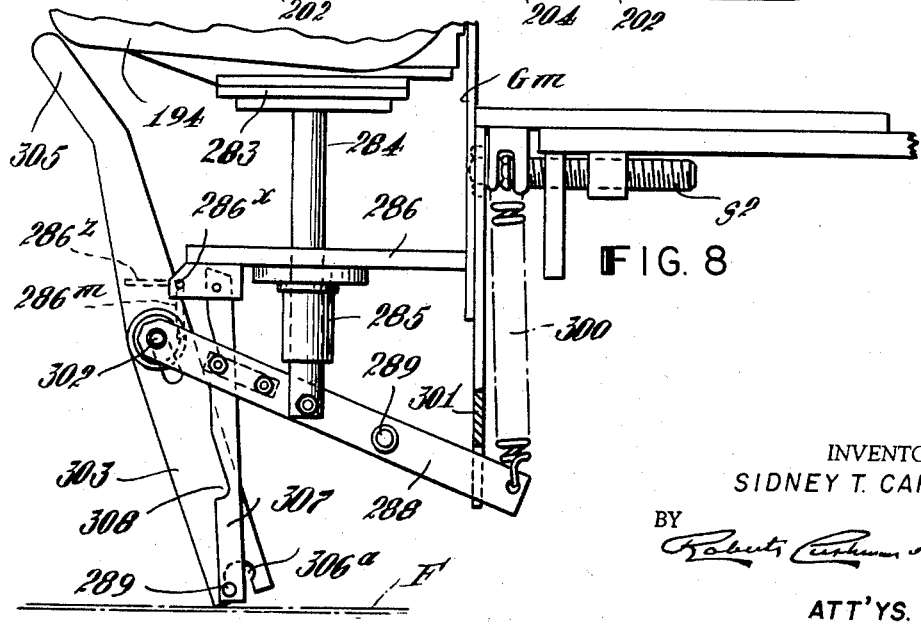
Fig. 8 is a fragmentary elevation, partly in vertical section, illustrating means useful in raising and lowering the gum box.

Normally, when the gum box is in use, the parts occupy the positions indicated in Fig. 8 wherein the lower ends of the straps 307 are just above the floor F and the lever 303 is in upright position with the bolts at the forward ends of the retainer plates 289$^a$ in the uppermost of the notches in the legs, and upward motion of the gum box, in response to the action of springs 300 is limited by engagement of the rear ends of arms 288 with the upper ends of the slots in parts 301. By pulling the handle 305 downwardly, it may be brought into position to engage its notch 306$^a$ with rod 289. Then by actuation of handles 286$^z$ of the locking bell cranks, the strap 307 may be swung to disengage the bolts at the forward ends of retainer plates 289$^a$ from the upper notches 310 and the handles 305 allowed to drop to some such position as that shown in Fig. 11. In this position of the parts, the gum box is so far below the roll 195 that a washpan W may be slid in over the gum box. Then by raising the handles 305, the rod 302 may be engaged with the lower notches 308 of the straps 307, thus supporting the washpan in the position shown in Fig. 12. The washpan may then be supplied with water for washing gum from the roll, the drive for the roll 195 being continued at low speed until the roll has been thoroughly cleaned, whereupon the gum box may again be lowered, the washpan removed, and the gum box again restored to operative position. If desired, means (not here shown) may be provided for circulating water through the washpan so as to keep the water sufficiently dilute to insure proper cleaning of the roll.

The gum box is preferably provided at its underside with dovetailed grooves (not here shown) for the reception of the supporting cradle 283 so that the box may be slid easily in or out of the gum box housing. Desirably, suitable latch means (not shown) of any conventional type may be used for holding the gum box in proper position on the suports 283, for example, during the removal of the washpan from the gum box.

For conveying gum from each roll 195 to the corresponding pickers, there is provided a transfer roll 197 (Fig. 3) which is journaled at its opposite ends in rock arms 198 (only one of which is shown) each mounted to turn on a stub shaft 199 fixed to the machine frame. Each roll 197 is of a length sufficient to supply gum simultaneously to a plurality of pickers, three pickers P¹, P² and P³ at each side of the machine being here shown (Figs. 1 and 2) and in order to insure that the axis of this roll 197 shall remain horizontal under all circumstances, each rock arm 198 is provided with an actuating crank 200 (Fig. 3), and each crank is connected by a rigid rod 201 to a corresponding arm 202 of a rigid rock frame fixed to a rock shaft 204. Each frame has a cam follower roll 203ᵃ which engages a cam 205 mounted on the main shaft 119.

As the pickers travel up toward the label holder, the transfer roll 197, which has previously received a coating of gum and which has moved up to its uppermost position, moves down and, in so moving, deposits a coat of gum on the faces of the pickers. The transfer roll 197 continues on down and into contact with the gum roll 195 to receive a fresh supply of gum while the picker continues up to take a label from the magazine. While receiving the gum, the blades of each picker are disposed in edge-to-edge contact; but, as the picker blades contact the label in the magazine, they separate, thus assisting in uniformly spreading the adhesive over the label surface and, at the same time, leaving a space between the blades through which a grip finger may pass in order to strip the label from the pickers, an operation which is common in the art.

Figure 14:
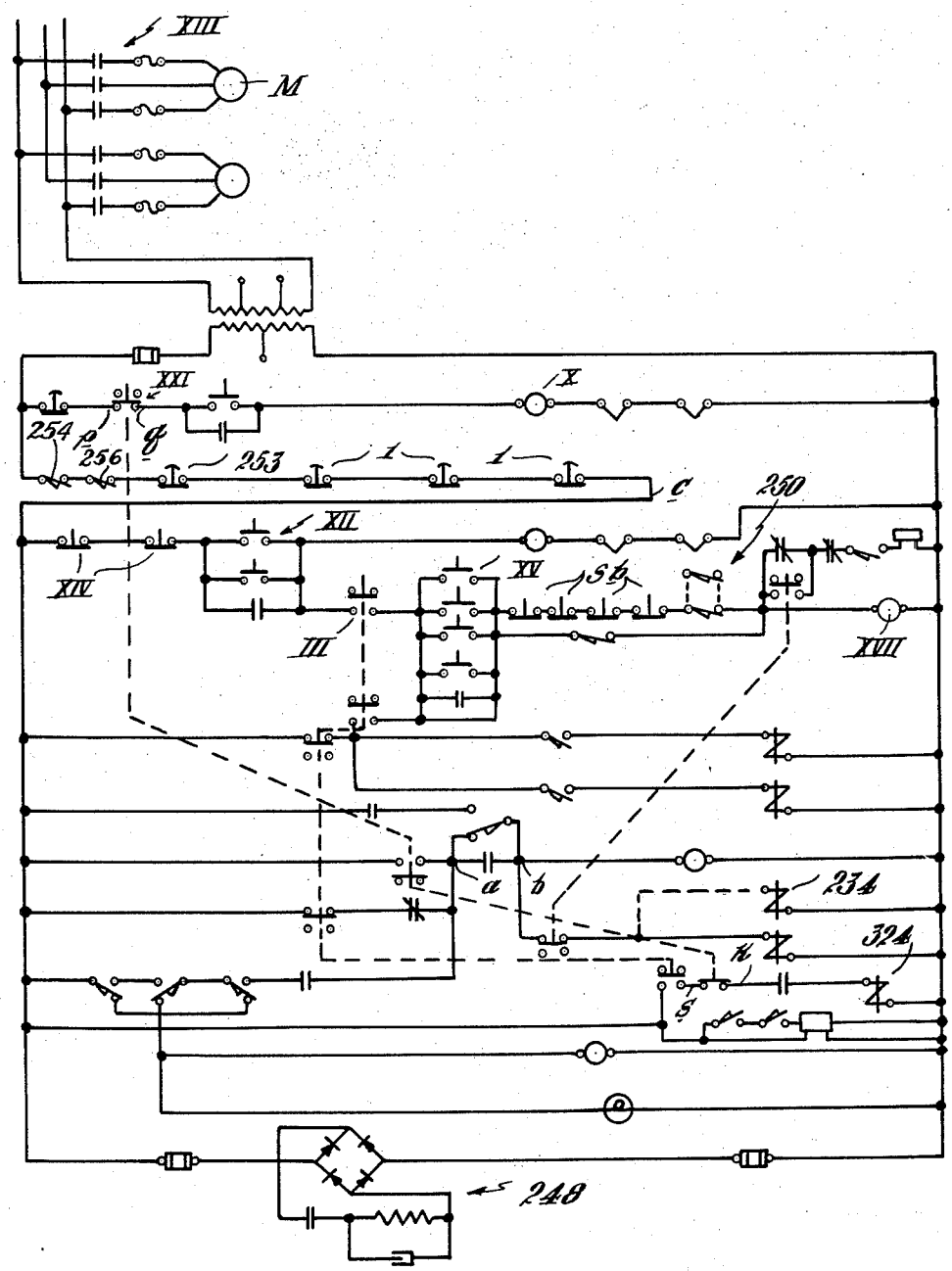
Fig. 14 is a wiring diagram showing electrical connections embodied in the labeling machine of Figs. 1 and 2 and including those which relate to the control of the gum-applying means.

In Fig. 14, there is illustrated a complete electrical circuit capable of controlling all of the various functions of a labeling machine like that more fully described in the aforesaid copending application, of which this is a division; but, since only a relatively few elements of that circuit are directly concerned in the operation of the gumming means, only relevant portions of the circuit are here designated by reference characters.

To start the motor M, the starting button on switch XII is manually pressed. This energizes the magnetic motor starter XIII and starts the motor, but this does not start the entire machine. To start the main drive shaft 119, the starter button of switch XV is pressed. This energizes the relay XVII which, among other things, energizes the clutch 248, thereby connecting the drive shaft 119 to the motor-driven shaft Sᵐ (Fig. 4).

If, during the operation of the machine, any of the switches 253, 254, 256 or XIV be opened, both the main shaft 119 and the motor will stop. On the other hand, if, while the machine is running, any of the switches III, Sᵇ or 250 be opened, the relay XVII will be de-energized and the main shaft 119 will stop, although the motor will continue to run; and, by means of the sprocket 261 and intermediate connections above described, will continue to turn the gum rolls 195, but at a very low speed as compared with their speed when the machine is functioning to apply labels.

Preliminary to the washing operation, the label magazines are removed, but the pickers continue to function in normal manner, even though no bottles are passing through the machine. This is desirable in order that the transfer roll may apply water to the full length of each picker, thus insuring proper washing of the pickers. In the apparatus described in the parent application of which this is a division, means is provided to prevent operation of the pickers in the absence of bottles, such means comprising a solenoid 234 (Fig. 14) which is normally energized, but whose circuit is ordinarily broken if no bottles are being labeled. To keep this solenoid 234 energized during the washing operation and thus to insure the normal operation of the pickers even though no bottles are moving along at this time, the switch XXI is opened, preliminary to the washing operation, thus breaking the circuit of vacuum pump X (Fig. 14) between points $p$ and $q$ and closing a circuit between the points $c, a$ (Fig. 14) and thus keeping the circuit of the solenoid 234 energized even though the switches in said circuit, which open in the absence of bottles, may, at this time, be open. The stopping of the vacuum pump during the washing operation saves wasting the energy necessary for driving it, and also assures that wash water will not accidentally be drawn into the suction orifices of the grip fingers, by means of which the labels are transferred from the pickers to the bottles.

As more fully described in the parent application, provision is made for driving the main shaft 119 at two different speeds under different circumstances, this change in speed being controlled by a solenoid valve 324. The opening of the switch XXI, preliminary to the washing operation, breaks the circuit between points $s$ and $r$ so that solenoid valve 324 is de-energized and the main shaft can only be driven at the lower of its two possible speeds during the washing operation.

It should be understood that the present disclosure is for the purpose of illustration only and that this invention includes all modifications and equivalents which fall within the scope of the appended claims.

I claim:

1. In a labeling machine of the kind having a conveyor for moving articles along a predetermined path, label-applying elements including a picker, a gum box, a gum-elevating roll in the gum box, and means for starting and stopping the conveyor and label-applying means, in combination, means for turning the gum elevating roll at a relatively high speed while the conveyor and labeling means are operative, and means for turning the gum roll at a predetermined, relatively lower speed while the conveyor and label-applying elements are stationary.

2. In a labeling machine of the kind which comprises a conveyor for moving articles along a predetermined path, label-applying means at opposite sides of said path, a gum box, provided with a gum-elevating roll, at each side respectively of the path, and means for driving the label-applying means, in combination, means for turning the two gum rolls in opposite directions, respectively, and at the same relatively high speed while the label-applying means is operative, and for turning the gum rolls at the same, but relatively lower speed, while the label-applying means is standing still.

3. In a labeling machine of the kind which includes a conveyor for moving articles along a predetermined path, means for applying labels to such articles comprising a picker, a gum-elevating roll, transfer means for delivering gum from the elevating roll to the picker, and means for operating the conveyor and label-applying means, in combination, means for turning the gum-elevating roll at a relatively high velocity while the conveyor and label-applying means are operative, and at a relatively lower velocity when the conveyor and label-applying means are at rest, and means for washing the gum-elevating roll while the latter continues to turn at said lower velocity.

4. In a labeling machine of the kind having a conveyor for moving articles along a predetermined path, a label magazine, a picker for removing labels from the magazine, a gum box having a gum-elevating roll therein, a main drive shaft, and means for transmitting motion from said drive shaft to the pickers, a motor having a shaft, and a clutch operative, at times, to transmit motion from the motor shaft to the main shatf, in combination, means operative alternatively to transmit motion from the main drive shaft or from the motor-driven shaft to the gum-elevating roll.

5. A labeling machine, according to claim 4, wherein the means for driving the gum-elevating roll comprises a sprocket wheel which turns, so long as the motor shaft is turning, a counter shaft, and connections operative, at times, to transmit motion from said sprocket wheel to the counter shaft, a sprocket wheel which turns with the main shaft, connections from said latter sprocket also operative, at times, to drive said counter shaft, but at a speed higher than the speed imparted by the first-named sprocket, and means for transmitting motion from the counter shaft to the gum-elevating roll.

6. A labeling machine, according to claim 5, wherein the sprocket which turns with the main drive shaft is larger than the sprocket which turns with the motor shaft, and the connections for transmitting motion from the larger sprocket to the counter shaft include an overrunning clutch whose driven element is fixed to the counter shaft.

7. In a labeling machine of the kind having a conveyor for moving articles along a predetermined path, and having pickers for removing labels from the magazine, a gum box having therein a gum-elevating roll and means for turning said roll, in combination, means for supporting the gum box for movement from an elevated, normal operating position to a position below said normal position, said supporting means comprising a box-holding cradle mounted on the upper end of a vertically slidable rod, a spring tending to elevate the rod thereby to hold the cradle in normal operative position, means for limiting such upward motion of the cradle, the lower end of the vertically movable cradle-supporting rod being pivotally connected to a rocker with whose rear end is associated a spring which tends to elevate said rear end, means limiting upward motion of said rear end of the rocker, a pin projecting laterally from the forward portion of the rocker, a hanger supported at its upper end and which has a plurality of vertically spaced notches, the hanger being so located as to permit the pin which projects from the rocker to be engaged with any selected one of said notches, and means whereby the forward end of the rocker may be moved so as to lower the cradle from its normal operative position until said pin enters a selected one of the notches in the hanger, thus holding the cradle in an inoperative lowered position.

8. In a labeling machine of the kind which includes a conveyor for moving articles along a predetermined path, means for applying labels to such articles comprising a picker, a gum-elevating roll, means including a vacuum pump for transferring a label from the picker to an article to be labeled, means for actuating the conveyor, pump, picker and gum-elevating roll at normal label-applying velocity, means whereby the pump may be stopped while the other aforesaid parts continue to operate but at a reduced velocity, and means for presenting cleaning fluid to the elevating roll thereby to clean the latter while the latter turns at said lower velocity.

9. In a labeling machine of the kind which includes a conveyor for moving articles along a predetermined path, means for applying labels to such articles comprising a picker, a gum-elevating roll, and transfer means for delivering gum from the elevating roll to the picker, means for operating the picker, gum-elevating roll and gum transfer means at a relatively high normal velocity, means for reducing the velocity of said parts preparatory to washing the picker, and means for applying cleansing fluid to the picker while the latter continues to operate at said lower velocity.

10. In a labeling machine of the kind having a conveyor for moving articles along a predetermined path, a label magazine, a picker for removing labels from the magazine, a gum box having a gum-elevating roll therein, a main drive shaft, means for transmitting motion from the drive shaft to the pickers and gum-elevating roll thereby to actuate said parts at a normal operating speed, a drive motor, means including a disengageable clutch which, when engaged, turns the main shaft at normal operating speed thereby to drive the conveyor, pickers, and gum-elevating roll, means for disengaging the clutch thereby to stop the main shaft, and means for transmitting motion from the motor to the gum-elevating roll while the main shaft is stationary, said last-named motion-transmitting means being so constructed and arranged as to turn the gum-elevating roll at a very slow or idling speed while the main shaft is stationary, thereby to prevent drying of the gum in the gum box.

11. In a labeling machine of the kind which has a conveyor for moving articles along a predetermined path, means for applying labels to such articles comprising a picker, a gum-elevating roll, transfer means for delivering gum from the elevating roll to the picker, a gum pan in which the elevating roll normally dips, means for driving the elevating roll comprising a driven shaft having thereon a sprocket wheel, a sprocket chain which embraces said wheel and a second sprocket wheel fixed to the shaft of the elevating roll, means supporting the gum box for bodily movement in a horizontal direction, means for so moving the gum box thereby to permit the gum roll to be adjusted bodily to different distances from the article path, and means operative to maintain the sprocket chain under proper driving tension regardless of the position of the gum box.

References Cited in the file of this patent

UNITED STATES PATENTS

| | | |
|---|---|---|
| 1,990,103 | Van Alstyne | Feb. 5, 1935 |
| 2,495,207 | Carter | Jan. 24, 1950 |
| 2,573,182 | Carter | Oct. 30, 1951 |
| 2,625,908 | Knot | Jan. 26, 1953 |